(12) United States Patent
Watters et al.

(10) Patent No.: US 6,204,975 B1
(45) Date of Patent: Mar. 20, 2001

(54) REFLECTIVE MICRO-DISPLAY SYSTEM

(75) Inventors: Wayde Watters, Kent; Gregory L. Heacock, Camas, both of WA (US); Russell M. Hudyma, San Ramon, CA (US)

(73) Assignee: Virtual Vision, Inc., Redmond, WA (US)

( * ) Notice: Subject to any disclaimer, the term of this patent is extended or adjusted under 35 U.S.C. 154(b) by 0 days.

(21) Appl. No.: 09/443,023

(22) Filed: Nov. 18, 1999

Related U.S. Application Data

(63) Continuation-in-part of application No. 09/219,065, filed on Dec. 22, 1998, now Pat. No. 6,005,720.

(51) Int. Cl.[7] .......................... G02B 27/14; G02B 27/12
(52) U.S. Cl. ....................... 359/633; 359/637; 359/640
(58) Field of Search .................................. 359/630, 631, 359/633, 636, 637, 639, 640; 345/7, 8

(56) References Cited

U.S. PATENT DOCUMENTS

| | | | | |
|---|---|---|---|---|
| 5,696,521 | * | 12/1997 | Robinson et al. | 345/8 |
| 5,771,124 | * | 6/1998 | Kintz et al. | 359/633 |
| 5,886,822 | * | 3/1999 | Spitzer | 359/630 |
| 5,892,624 | * | 4/1999 | Kintz et al. | 359/637 |

* cited by examiner

Primary Examiner—Ricky Mack
(74) Attorney, Agent, or Firm—McAndrews, Held & Malloy, Ltd.

(57) ABSTRACT

A miniature display system uses a reflective micro-display that reflects light perpendicular to the surface of the display to generate an image. Light from an off-axis light source is polarized and reflected by a prism to provide on-axis illumination light for the display. The prism uses total internal reflection and/or a polarizer as a beam splitting surface so as to increase the brightness of the image generated by the display. The optical system provides a virtual image with a large field of view so that the small display system can be used in portable, hand-held or head mounted systems to display a large amount of information to the user.

16 Claims, 5 Drawing Sheets

REFLECTIVE MICRO-DISPLAY SYSTEM

CROSS-REFERENCE TO RELATED APPLICATIONS

This is a continuation-in-part of U.S. patent application Ser. No. 09/219,065 filed Dec. 22, 1998 now U.S. Pat. No. 6,005,720.

STATEMENT REGARDING FEDERALLY SPONSORED RESEARCH OR DEVELOPMENT

Not Applicable

FIELD OF THE INVENTION

The present invention relates to reflective display systems and more particularly to such systems having a reflective micro-display that requires light perpendicular to the surface of the display to generate an image.

BACKGROUND OF THE INVENTION

Miniature or micro-displays are known which are so small that they generate an image that the eye cannot resolve without the aid of magnification optics. These micro-displays have a sufficiently large number of pixels to generate an image of alpha-numeric information such as is capable of being generated on a standard size computer CRT display. One type of micro-display is shown in U.S. Pat. No. 5,771,124. This patent shows a reflective display system that is responsive to non-perpendicular light that impinges on the display at a particular angle in order to generate an image. A beam splitter, reflective magnifying lens and a second magnifying lens are used to direct light from the display to a user's eye so that an enlarged virtual image of the display generated image can be discerned.

Another known type of reflective micro-display requires on-axis light to generate an image. On-axis light as used herein is light that is generally or substantially perpendicular to the surface of the display. In this type of reflective micro-display, pixels in an in-active mode absorb light and pixels in an active mode reflect on-axis light so as to generate an image. In known reflective micro-displays of this type, multiple beam splitters having a partially reflective coating have been used to reflect light from an off-axis light source to the display surface. Multiple beam splitters of this type, however, greatly reduce the light throughput of the system and the resulting brightness of the image generated so that the image is difficult to discern.

BRIEF SUMMARY OF THE INVENTION

In accordance with the present invention, the disadvantages of prior reflective display systems requiring on-axis light have been overcome. The display system of the present invention has a miniature display and a minimal number of optics to provide a virtual image with enhanced brightness and a large field of view, heretofore not realized with such a small display system.

More particularly, the display system of the present invention includes a reflective display having a plurality of pixels, each of which in an active mode is responsive to on-axis light that is generally perpendicular to the surface of the display for reflecting the on-axis light to generate an image. A light source is positioned off-axis with respect to the display so as not to block any portion of the image generated by the reflective display. An illumination system with a single beam splitter is provided to direct the light from the light source to the display. The illumination system includes a prism with a first surface for reflecting light from the light source to the beam splitter surface. The beam splitter surface in turn reflects light from the first prism surface to the reflective display so that the light is generally perpendicular to the surface of the display to generate an image. The beam splitter passes therethrough light reflected from the display to an imaging optical system. The imaging optical system receives light passed through the beam splitter from the display for providing an enlarged virtual image, viewable by a user.

In one embodiment of the present invention, the prism uses total internal reflection for reflecting light from the first prism surface to the beam splitter surface and/or for reflecting light from the beam splitter surface to the reflective display. Because total internal reflection is used to form the beam splitter surface, little light is lost at this surface and the brightness of the image is greatly enhanced.

In another embodiment of the present invention, the illumination system includes a polarizer for polarizing the light from the light source that is directed to the first prism surface. The prism may use total internal reflection for reflecting light from the first prism surface to the beam splitter surface and/or for reflecting light from the beam splitter surface to the reflective display.

In a further embodiment of the present invention, the beam splitter surface is formed of a second polarizer that reflects light of a first polarization received from the first prism surface and that passes therethrough light of a second polarization received from the display. The first prism surface may use total internal reflection or a reflective coating to reflect the light from the light source to the beam splitter surface. The use of one or more polarizers allows greater light throughput than in prior systems to increase the brightness of the image.

The imaging optics of the present invention provide a virtual image with a large field of view that is 28° or greater and even on the order of 38° for a reflective, micro-display.

The display system of the present invention is extremely small having a height on the order of 25 mm but provides a bright image with a large field of view. The display system of the present invention is capable of displaying large amounts of alpha-numeric information such as typically displayed on a standard size computer CRT display. However, because of the display system's small size it is a suitable display for portable or hand-held computer and/or communication devices such as a pager or other messaging system. It is also suitable for use in a head mounted display system. The display system of the present invention substantially increases the amount of information that can be displayed to a user in an extremely small package with minimum optical elements.

These and other advantages and novel features of the present invention, as well as details of an illustrated embodiment thereof, will be more fully understood from the following description and drawings.

DETAILED DESCRIPTION OF THE INVENTION

Figure 1:
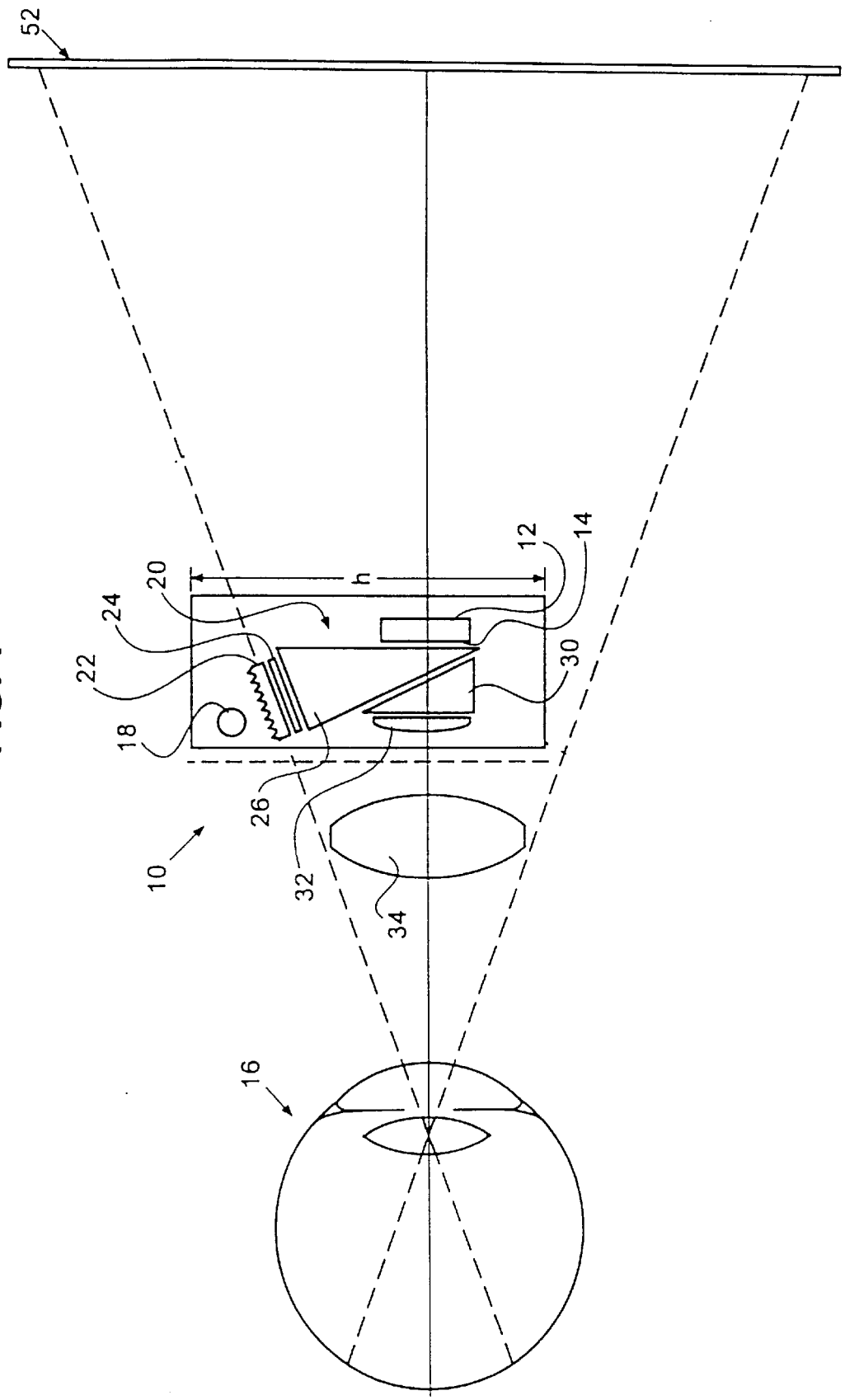
FIG. 1 is a side view of one embodiment of the reflective micro-display system of the present invention.

The display system 10 of the present invention includes a reflective micro-display 12 having a large number of pixels, which in an in-active mode absorb light and in an active mode are responsive to on-axis light that is substantially or generally perpendicular to the surface 14 of the display 12 for reflecting on-axis light to generate an image. The image generated by the display 12 is so small that it cannot be resolved by an eye 16 without magnification. The height and width of the display 12 may be on the order of 12 mm×12 mm. However, the display 12 has a sufficiently large number of pixels so as to be capable of displaying as much information as a standard size NTSC computer display. The overall height, h, of the system is only 25 mm.

The display system 10 includes a light source 18 that is positioned off-axis with respect to the display 12, i.e., not in front of the display, so as not to block any portion of the optical path from the display 12 to the user's eye 16. The light source may be a single LED. Alternatively, the light source may be formed of a number of colored LED's such as a red LED, a green LED and a blue LED for a color display system.

Light from the light source 18 is directed to a front surface 14 of the display 12 for reflection by the active pixels by an illumination system 20 that includes a lens 22, a polarizer 24 and prism 26. Light reflected by the active pixels of the display passes through an imaging system, that in one embodiment includes a refraction corrector in the form of a second prism 30, a field lens 32 and an imaging lens 34.

Figure 2:
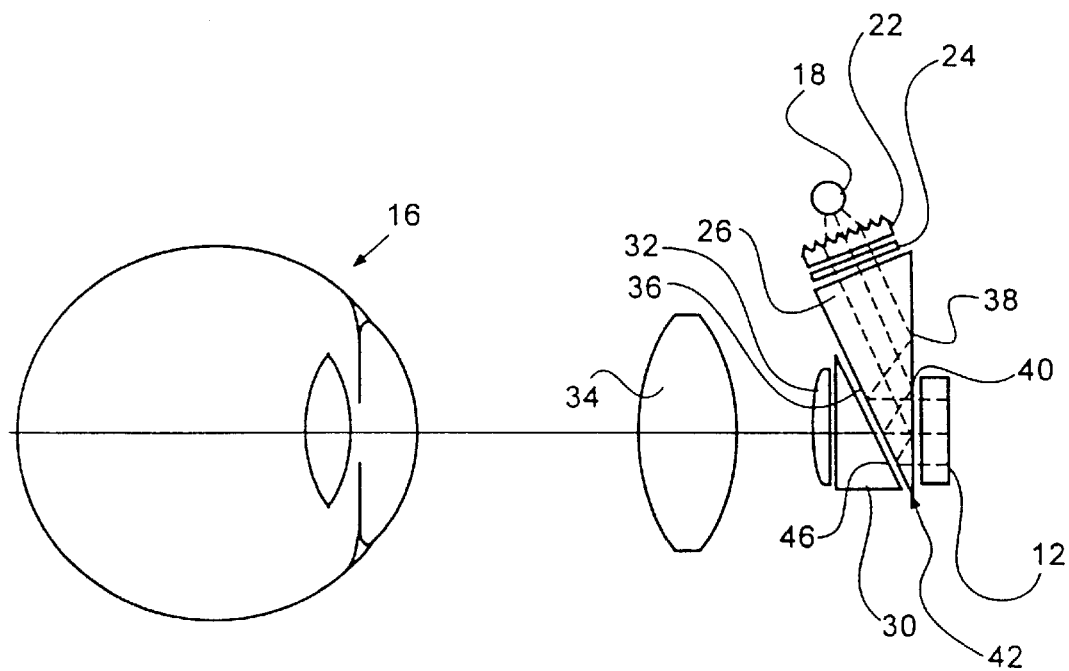
FIG. 2 is a side view of the reflective micro-display system of FIG. 1 illustrating the illumination light path from the light source to the micro-display.

As shown in more detail in FIG. 2, light from the source 18 passes through the illumination lens 22. The illumination lens 22 may be a fresnell lens or the like for collimating light and directing it to the polarizer 24. The polarizer 24 polarizes the light so that it is, for example, S polarized with respect to a beam splitting surface 36 of the prism 26. The polarized light enters the prism 26 and is reflected from a surface 38 of the prism to the beam splitting surface 36 of the prism 26. The beam splitting surface 36 reflects the S polarized light to the micro-display so that it is on-axis, i.e., perpendicular to the surface of the display 12. The reflective micro-display 12 includes a quarter-wave plate that changes the linearly polarized light from the beam splitter to circular or nearly elliptical polarization as the light enters the display 12. The light reflected by the active pixels of the micro-display 12 pass through the quarter wave plate of the display 12 again, becoming linearly polarized but at 900 from the original polarization of the light reflected from the surface 36 of the prism 26. Specifically, where the surface 36 reflects S polarized light to the display, the display 12 with quarter wave plate therein passes P polarized light back to the surface 36. The P polarized light passes through the beam splitter surface 36 to the prism 30 of the imaging system 28.

In a preferred embodiment, the angles of the prism 26 are selected so that the light is reflected by surface 38 to surface 36 by total internal reflection and/or the light is reflected by the beam splitting surface 36 to the display 12 by total internal reflection. An air gap 40 is maintained between the display 12 and the surface 38 for maximum light throughput via total internal reflection off of the surface 38. Similarly, if total internal reflection is used to reflect light from the surface 36 so that it is on-axis with respect to the display 12, an air gap 42 or the like is maintained between the surface 36 and the second prism 30. Instead of employing total internal reflection, for the surface 38 to reflect light from the image source 18, the surface 38 up to the edge 44 of the display 12 may use a reflective coating. The display 12 can then be mounted on the remaining portion of the surface 38 with an index matching fluid or adhesive. Similarly, instead of using total internal reflection at surface 36 to reflect light on-axis to the display 12, a polarizer reflector may be used or a partially reflective mirror coating. A polarizer reflector may be formed of a glass or plastic sheet with a coating such as the 3M film DBEF. This polarizer reflector may be formed as a separate component with an air gap on one or both sides thereof or it may be laminated to either the surface 36 of the prism 26 or to a surface 46 of the prism 30 or both.

Figure 3:
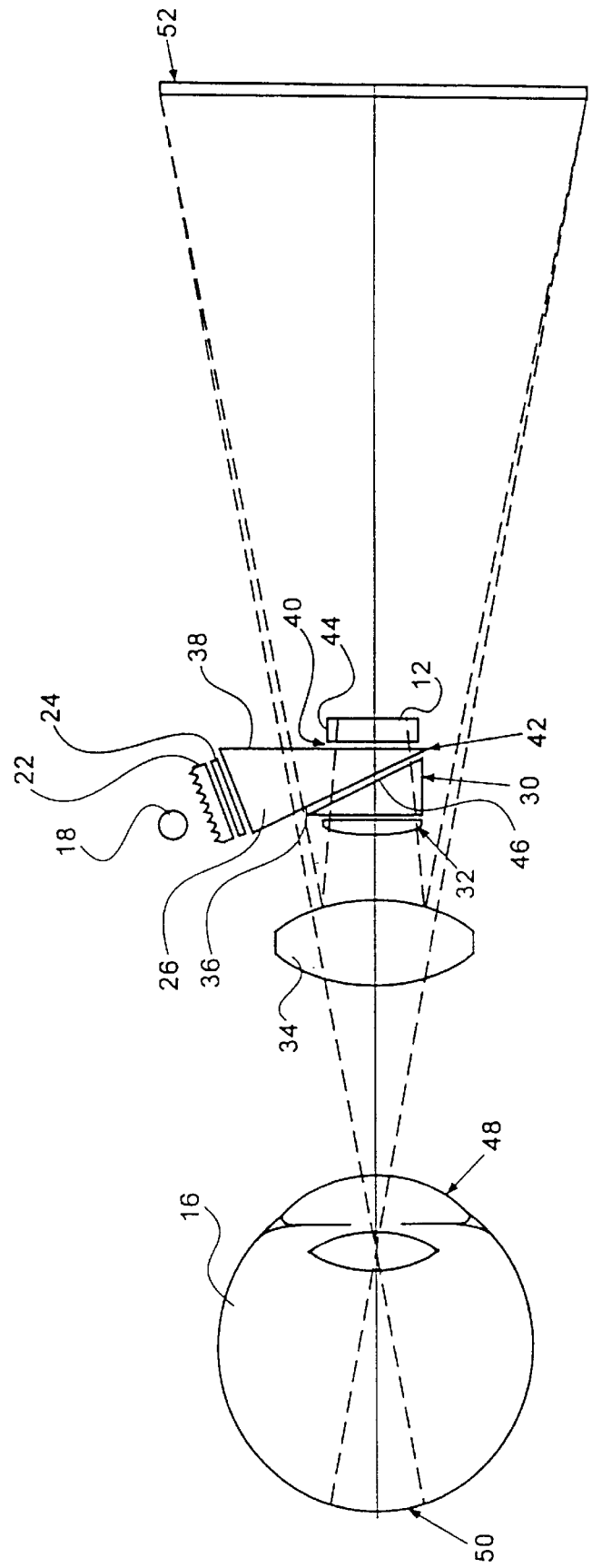
FIG. 3 is a side view of the reflective micro-display system of FIG. 1 illustrating the image path from the reflective micro-display.

FIG. 3 illustrates the image ray path of the display system as the illumination light is reflected from the active pixels of the display 12. The light reflected from the display 12 passes through the prism 26 and beam splitter surface 36 to the prism 30. The prism 30 corrects the image generated by the display 12 for refraction. A field lens 32 that may be formed as an integral part of the optic 30 or as a separate lens, directs the image rays towards the imaging lens 34. When the rays exit the imaging lens 34, they are generally parallel, until the rays intersect the corneal surface 48 of the user's eye 16. The cornea focuses the rays onto the retina 50. To the user, the rays appear to originate from a virtual image location 52 in front of the user but at a location that is at a greater distance from the user than the display system 10. The virtual image 52 is substantially magnified by the lens 34 so that the user can clearly resolve the details of the image generated by the display 12.

Figure 4:
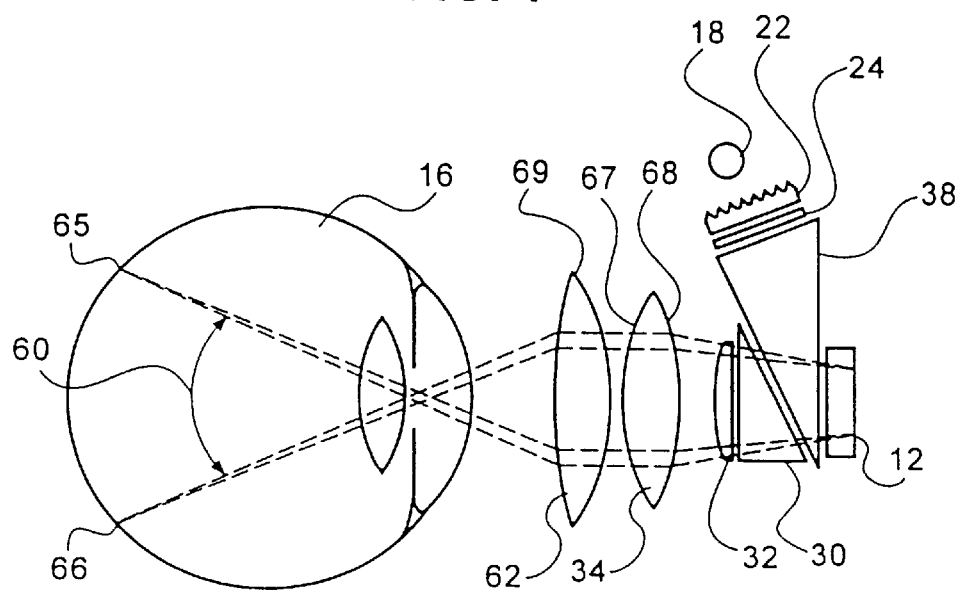
FIG. 4 is a side view of a second embodiment of the reflective micro-display system for increasing the field of view.

In another embodiment of the imaging system 28, an additional lens 62, as shown in FIG. 4, is used and the optical power of the lens 34 is decreased so as to increase the angle 60 of the image rays as they pass from the display 12 through the lenses 34 and 62 into the cornea 13 forming an image on the retina of the user's eye. Since the field of view that the user perceives is determined by the ray angle 60 of the image formed on the retina 14 between points 65 and 66, the increase in the angle 60 with the addition of the lens 62 provides an increased field of view on the order of at least 28°. In order to provide for color correction, either surface 67 or 68 of lens 34 or the surface 69 of the lens 62 may be formed as a diffractive surface. It is further noted that the field lens 32 may be formed as a separate optical element or an integral part of the optic 30. Moreover, in order to change the focus or location of the virtual image 52, the lens 34 may be movable relative to the lens 32. Alternatively, the pair of lenses 62 and 34 may be movable together with respect to the field lens 32. Although not preferred, this feature may also be accomplished by moving the display 12 relative to the optical system.

Figure 5:
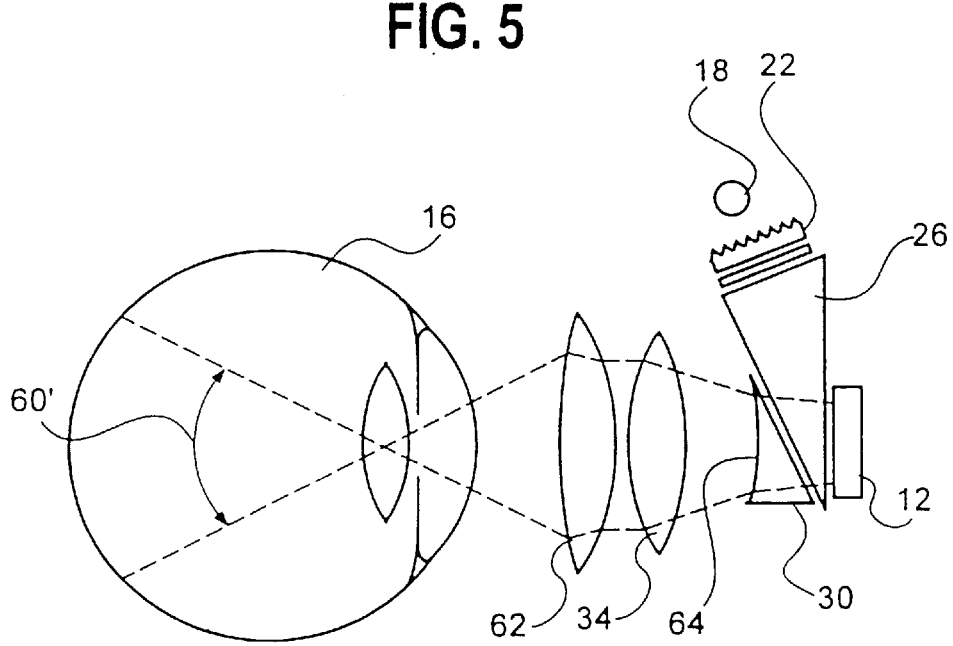
FIG. 5 is a side view of another embodiment of the present invention with a further increased field of view.

The field of view may be increased even further in accordance with the embodiment depicted in FIG. 5 while still maintaining adequate eye relief for use with eyeglasses. As opposed to using a positive field lens 32 as depicted in FIG. 4, the embodiment of FIG. 5 employs a negative lens 64. The negative lens may be formed as a separate element or it may be formed in the surface of the optic 30 as shown in FIG. 5. The negative lens 64 causes the rays from the display 12 to diverge so as to increase the angle 60' between the rays as compared to the angle 60 of FIG. 4. The increased angle, 60' results in an increased field of view on the order of 38°.

Figure 6:
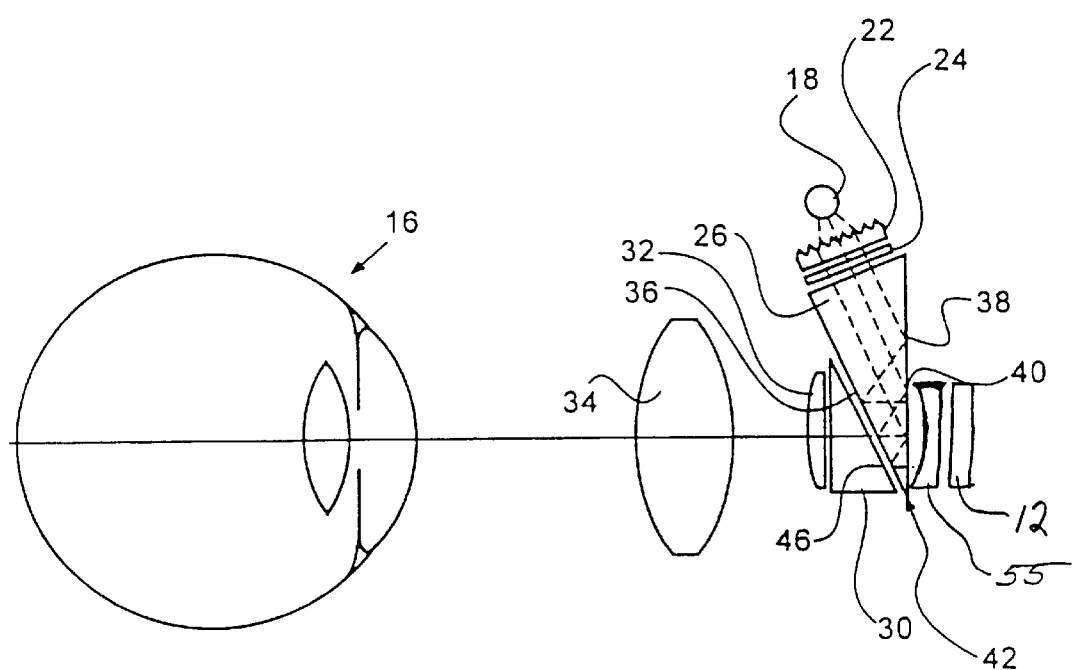
FIG. 6 is a side view of the reflective micro-display system of FIG. 1 with the addition of a lens between the display and first prism.

In a further embodiment of the present invention, as shown in FIG. 6, a lens 55 is disposed between the display 12 and the prism 26 of the system shown in FIGS. 1–3 to provide color correction, minimize certain types of distortions and to eliminate the need for precise alignment of the eye with the imaging system. More particularly, the lens 55 preferably has a different index of refraction than the prism 26 so as to minimize chromatic aberrations in a manner similar to an achromat. For example, the prisms 26 and 30 may be formed of glass, such as BK 7 glass and the negative lens 55 may be formed of Styrene. However, as will be apparent to one of ordinary skill in the art, the prisms 26, 30 and lens 55 can be formed of other types of materials as well. The lens 55 is formed as a negative lens. The negative lens 55 minimizes geometric distortions about the periphery of the image, for example, barrel distortion and pin cushion distortion. Further, the negative lens 55 slightly diverges the light from the display 12 so as to eliminate the need for precise alignment of the eye 16 with the centerline of the imaging lens 34. It is noted that, in this embodiment, the imaging lens 34 may be an aspheric lens formed of acrylic or the like. By using an aspheric imaging lens 34, a high resolution image can be generated with minimal distortions using few optical elements so as to provide a lightweight display system.

The optical system of the present invention allows a field of view of 28° or greater for an extremely small display 12. This field of view is provided for a micro-display 12 having a 0.5 inch diagonal and a vertical to horizontal aspect ratio of 3/4. This large field of view is obtained with minimal imaging optics as depicted in the drawing. Further, the illumination system of the present invention as discussed above provides an image with increased brightness so as to be suitable for a display system used in daylight.

Many modifications and variations of the present invention are possible in light of the above teachings. Thus, it is to be understood that, within the scope of the appended claims, the invention may be practiced otherwise than as described hereinabove.

What is claimed and desired to be secured by Letters Patent is:

1. A display system comprising:
    a reflective display having a plurality of pixels, each of which in an active mode is responsive to on-axis light that is generally perpendicular to the surface of the display for reflecting the on-axis light to generate an image;
    a light source positioned off-axis with respect to the display;
    an illumination system with a single beam splitter for directing light to the display, the illumination system having a prism with a first surface for reflecting light from the light source to a beam splitter surface, the beam splitter surface reflecting light from the first prism surface to the reflective display so that the light is generally perpendicular to the surface of the display to generate an image and the beam splitter passing therethrough light reflected from the display;
    a lens disposed between the prism and the display to minimize chromatic aberrations; and
    an imaging optical system receiving light passed through the beam splitter from the display for providing an enlarged virtual image.

2. A display system as recited in claim 1 wherein said lens has a different refractive index than said prism to minimize chromatic aberrations.

3. A display system as recited in claim 1 wherein said lens is a negative lens.

4. A display system as recited in claim 1 wherein said lens minimizes barrel distortion.

5. A display system as recited in claim 1 wherein said lens minimizes pin cushion distortion.

6. A display system comprising:
    a reflective display having a plurality of pixels, each of which in an active mode is responsive to on-axis light that is generally perpendicular to the surface of the display for reflecting the on-axis light to generate an image;
    a light source positioned off-axis with respect to the display;
    an illumination system with a single beam splitter for directing light to the display, the illumination system having a prism with a first surface for reflecting light from the light source to a beam splitter surface, the beam splitter surface reflecting light from the first prism surface to the reflective display so that the light is generally perpendicular to the surface of the display to generate an image and the beam splitter passing therethrough light reflected from the display;
    a negative lens disposed between the prism and display; and
    an imaging optical system receiving light passed through the beam splitter from the display for providing an enlarged virtual image.

7. A display system as recited in claim 6 wherein said lens has a different refractive index than said prism to minimize chromatic aberrations.

8. A display system as recited in claim 6 wherein said lens minimizes barrel distortion.

9. A display system as recited in claim 6 wherein said lens minimizes pin cushion distortion.

10. A display system comprising:
    a reflective display having a plurality of pixels, each of which in an active mode is responsive to on-axis light that is generally perpendicular to the surface of the display for reflecting the on-axis light to generate an image;
    a light source positioned off-axis with respect to the display;
    an illumination system with a single beam splitter for directing light to the display, the illumination system having a prism with a first surface for reflecting light from the light source to a beam splitter surface, the beam splitter surface reflecting light from the first prism surface to the reflective display so that the light is generally perpendicular to the surface of the display to generate an image and the beam splitter passing therethrough light reflected from the display;
    a lens disposed between the prism and display to minimize geometric distortions in the generated image; and
    an imaging optical system receiving light passed through the beam splitter from the display for providing an enlarged virtual image.

11. A display system as recited in claim 10 wherein said lens has a different refractive index than said prism to minimize chromatic aberrations.

12. A display system as recited in claim 11 wherein said lens is a negative lens.

13. A display system comprising:

a reflective display having a plurality of pixels, each of which in an active mode is responsive to light impinging on a front surface of the display for reflecting the impinging light to generate an image;

a light source positioned off-axis with respect to the display;

an illumination system with a single beam splitter for directing light to the display, the illumination system having a prism with a first surface for reflecting light from the light source to a beam splitter surface, the beam splitter surface reflecting light from the first prism surface to the front surface of the reflective display to generate an image and the beam splitter passing therethrough light reflected from the display; and an imaging optical system receiving light passed through the beam splitter from the display for providing an enlarged virtual image.

14. A display system as recited in claim 13 including a lens disposed between the prism and the display to minimize chromatic aberrations.

15. A display system as recited in claim 13 including a negative lens disposed between the prism and display.

16. A display system as recited in claim 13 including a lens disposed between the prism and display to minimize geometric distortions.

* * * * *